(12) United States Patent
Sasaki et al.

(10) Patent No.: US 11,155,727 B2
(45) Date of Patent: Oct. 26, 2021

(54) INK COMPOSITION FOR INKJET TEXTILE PRINTING AND METHOD FOR TEXTILE PRINTING OF HYDROPHOBIC FIBERS

(71) Applicant: Nippon Kayaku Kabushiki Kaisha, Tokyo (JP)

(72) Inventors: Keijyou Sasaki, Tokyo (JP); Rima Akanuma, Tokyo (JP); Hiroko Higuchi, Tokyo (JP); Katsunori Fujii, Tokyo (JP); Makoto Teranishi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/615,055

(22) PCT Filed: May 24, 2018

(86) PCT No.: PCT/JP2018/019963
§ 371 (c)(1),
(2) Date: Nov. 19, 2019

(87) PCT Pub. No.: WO2018/221370
PCT Pub. Date: Dec. 6, 2018

(65) Prior Publication Data
US 2020/0109302 A1 Apr. 9, 2020

(30) Foreign Application Priority Data

Jun. 1, 2017 (JP) .............................. JP2017-109095

(51) Int. Cl.
| | | |
|---|---|---|
| *C09D 11/328* | (2014.01) | |
| *B41J 3/407* | (2006.01) | |
| *B41M 5/00* | (2006.01) | |
| *C09D 11/102* | (2014.01) | |
| *C09D 11/36* | (2014.01) | |
| *B41J 2/21* | (2006.01) | |
| *C09D 11/30* | (2014.01) | |

(52) U.S. Cl.
CPC .......... *C09D 11/328* (2013.01); *B41J 2/2107* (2013.01); *B41J 3/4078* (2013.01); *B41M 5/0023* (2013.01); *C09D 11/102* (2013.01); *C09D 11/30* (2013.01); *C09D 11/36* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2/04588; B41J 2/04595; B41J 2/04586; B41J 2/14274; B41J 3/4078; B41M 5/0011; B41M 5/0017; B41M 5/0023; B41M 5/0047; B41M 7/00; B41M 7/0072; B41M 5/52; B41M 5/5218; B41M 5/5227; B41M 5/00; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; D06P 5/30
See application file for complete search history.

(56) References Cited

U.S. PATENT DOCUMENTS

| | | | |
|---|---|---|---|
| 8,586,647 B2 | 11/2013 | Kojima et al. | |
| 2001/0001103 A1* | 5/2001 | Noguchi ................ | C09D 11/30 528/71 |
| 2002/0124769 A1* | 9/2002 | Hirasa .................... | C09D 11/30 106/31.9 |
| 2008/0070009 A1 | 3/2008 | Akatani et al. | |
| 2009/0098312 A1 | 4/2009 | Goto et al. | |
| 2011/0205291 A1* | 8/2011 | Yasuda ................ | C09D 11/101 347/21 |
| 2014/0132685 A1* | 5/2014 | Amao .................... | B41J 2/2107 347/102 |
| 2015/0116419 A1* | 4/2015 | Oura ....................... | C09D 11/10 347/20 |

FOREIGN PATENT DOCUMENTS

| | | |
|---|---|---|
| CN | 101400750 A | 4/2009 |
| CN | 105968955 A | 9/2016 |
| JP | H09-111173 A | 4/1997 |
| JP | H10-168151 A | 4/1998 |
| JP | 2004-018544 A | 1/2004 |

(Continued)

OTHER PUBLICATIONS

Extended European Search Report issued in European Patent Application No. 18810192.7, dated Jan. 12, 2020.

(Continued)

*Primary Examiner* — Manish S Shah
(74) *Attorney, Agent, or Firm* — Knobbe Martens Olson & Bear LLP

(57) ABSTRACT

An ink composition for inkjet textile printing containing a urethane resin, a dispersant and a disperse dye, in which the content of the urethane resin is greater than 0.035 mass % but less than 6 mass %, and a method for textile printing of hydrophobic fibers using the ink composition.

15 Claims, No Drawings

(56) References Cited

FOREIGN PATENT DOCUMENTS

| | | |
|---|---|---|
| JP | 2007-270143 A | 10/2007 |
| JP | 2012-236954 A | 12/2012 |
| JP | 2015-059197 A | 3/2015 |
| JP | 2017-002266 A | 1/2017 |
| JP | 2017-043736 A | 3/2017 |
| JP | 2017-171907 A | 9/2017 |
| WO | WO 2005/121263 A1 | 12/2005 |
| WO | WO 2007/105806 A1 | 9/2007 |

OTHER PUBLICATIONS

Office Action issued in Korean Patent Application No. 10-2019-7035069, dated Nov. 30, 2020.

* cited by examiner

INK COMPOSITION FOR INKJET TEXTILE PRINTING AND METHOD FOR TEXTILE PRINTING OF HYDROPHOBIC FIBERS

This application is the U.S. National Phase under 35 U.S.C. § 371 of International Application PCT/JP2018/019963, filed May 24, 2018, designating the U.S., and published in Japanese as WO 2018/221370 on Dec. 6, 2018 which claims priority to Japanese Patent Application No. 2017-109095, filed Jun. 1, 2017, the entire contents of which are incorporated herein by reference.

TECHNICAL FIELD

The present invention relates to an ink composition for inkjet textile printing and a method for textile printing hydrophobic fibers using the same.

BACKGROUND ART

In recent years, there has been proposed a recording method for performing plate-less printing by inkjet, and textile printing by inkjet printing has also been performed in the textile printing of fibers including cloth, etc. Textile printing by inkjet printing has various advantages compared to textile printing by conventional screen printing, etc., such as no plate-making; resource saving; energy saving; and easy high-definition expression.

Here, hydrophobic fibers typified by polyester fibers are generally dyed by a water-insoluble coloring matter. For this reason, as an aqueous ink for textile printing hydrophobic fibers by inkjet printing, dispersed inks in which a water-insoluble coloring matter is dispersed in water are generally used.

Inkjet textile printing methods for hydrophobic fibers are roughly classified into a direct textile printing method (direct printing method) and sublimation transfer textile printing methods (sublimation transfer printing method). The direct textile printing method is a textile printing method in which ink is directly applied (printed) to hydrophobic fibers, and then a dye in the ink is heat treated by high temperature steaming or the like, so that the dye is dyed to the hydrophobic fibers. On the other hand, the sublimation transfer textile printing method is a textile printing method in which ink is applied (printed) to an intermediate recording medium (a special transfer paper, etc.), then an ink application surface of the intermediate recording medium and hydrophobic fibers are superposed on each other, and a dye is transferred from the intermediate recording medium to the hydrophobic fibers by a thermocompression bonding method using a thermocompression bonding roller, a thermo-press, etc.

The sublimation transfer textile printing method is mainly used for pattern textile printing of banner flags, etc. and easily sublimable dyes which are excellent in transferability to hydrophobic fibers by heat treatment are used in the ink. The processing steps include the two steps of (1) a printing step: a step of applying a dye ink to an intermediate recording medium by an inkjet printer; and (2) a transfer step: a step of transferring and dyeing the dye from the intermediate recording medium to the fibers by heat treatment. Since commercially available transfer papers can be widely used, pretreatment of fibers is not required, and a washing step is also omitted.

As an ink used in the sublimation transfer textile printing method, an aqueous ink in which a water-insoluble sublimable dye is dispersed in water has been known. For example, Patent Document 1 discloses that an ink is prepared by adding a water-soluble organic solvent as a humectant (an anti-drying agent), a surfactant as a surface tension adjusting agent, and other additives (a pH adjusting agent, an antiseptic agent, a defoaming agent, etc.) to an aqueous dispersion obtained by dispersing a sublimable dye selected from a dispersion dye and an oil-soluble dye in water using a dispersant, followed by optimizing physical properties such as particle size, viscosity, surface tension, and pH.

Patent Document 1: PCT International Publication No. WO 2005/121263

DISCLOSURE OF THE INVENTION

Problems to be Solved by the Invention

However, in commercial printing, inkjet printing is becoming faster, and the design of inks which can handle speeding up has also been demanded in inks for inkjet printing. If the processing time for drying, fixing or the like after recording is shortened in order to improve the speed of inkjet recording, a phenomenon arises in that the penetration of water or an organic solvent in the ink into the recording medium or drying this does not catch up with a subsequent recorded image being superimposed, and an image formed on the recording medium is transferred to the back surface of the recording medium stacked thereon, or a phenomenon arises in that the recording media are stuck together, and the recorded images and the recording media are damaged, or the like. In order to prevent these problems, a method for using an organic solvent having high volatility at the time of ink preparation has been known, but using an organic solvent increases permeability into a recording medium such as paper, and this lowers a color developing property as an ink. This problem is particularly significant when low basis weight papers are used. Therefore, there is a need for an ink excellent in a drying property on a recording medium and a color developing property.

It has also been proposed to add a binder resin to an ink for the purpose of fixing a water-insoluble coloring matter to fibers. However, it has been found that a re-discharging property after being left open will deteriorate, depending on the type of the binder resin. In the case of performing inkjet textile printing, after the printer is filled with ink and the ink is discharged, discharge is interrupted for about several tens of minutes, and discharge is restarted to perform textile printing, in many cases. In this manner, restarting discharge after discharge is interrupted is referred to as "re-discharge after being left open" or "intermittent discharge", and the like. An ink having a poor re-discharge property after being left open needs a cleaning operation of the head, when discharge is restarted, and this results in extremely poor usability. For this reason, for inks for inkjet textile printing, an improvement in re-discharge property after being left open is strongly demanded.

Accordingly, it is an object of the present invention to provide an ink composition for inkjet textile printing which is excellent in a re-discharge property after being left open, a drying property on a recording medium and a color developing property; and a method for textile printing hydrophobic fibers using the same.

Means for Solving the Problems

As a result of intensive studies to solve the above-mentioned problems, the inventors have completed the present invention according to the following first to fifteenth aspects.

A first aspect of the present invention provides an ink composition for inkjet textile printing containing a urethane resin, a dispersant and a disperse dye, in which the content of the urethane resin is greater than 0.035% by mass and less than 6% by mass.

A second aspect of the present invention provides the ink composition for inkjet textile printing according to the first aspect, in which the content of the urethane resin is greater than 2% by mass and less than 6% by mass.

A third aspect of the present invention provides the ink composition for inkjet textile printing according to the first or second aspect, in which the urethane resin includes at least one selected from polycarbonate-based urethane resins and polyether-based urethane resins.

A fourth aspect of the present invention provides the ink composition for inkjet textile printing according to any one of the first to third aspects, in which the disperse dye includes at least one selected from the group consisting of C.I. Disperse Yellow, C.I. Disperse Orange, C.I. Disperse Blue and C.I. Disperse Red.

A fifth aspect of the present invention provides the ink composition for inkjet textile printing according to the fourth aspect, in which the disperse dye includes at least one selected from the group consisting of C.I. Disperse Yellow 54, C.I. Disperse Orange 25, C.I. Disperse Blue 56, C.I. Disperse Blue 72, C.I. Disperse Blue 359, C.I. Disperse Blue 360 and C.I. Disperse Red 60.

A sixth aspect of the present invention provides the ink composition for inkjet textile printing according to any one of the first to fifth aspects, in which the dispersant includes at least one selected from styrene-(meth)acrylic copolymers and formalin condensates of aromatic sulfonic acids.

A seventh aspect of the present invention provides the ink composition for inkjet textile printing according to the sixth aspect, in which the mass average molecular weight of the styrene-(meth)acrylic copolymer is 1,000 to 20,000.

An eighth aspect of the present invention provides the ink composition for inkjet textile printing according to the seventh aspect, in which the mass average molecular weight of the styrene-(meth)acrylic copolymer is 2,000 to 19,000.

A ninth aspect of the present invention provides the ink composition for inkjet textile printing according to the eighth aspect, in which the mass average molecular weight of the styrene-(meth)acrylic copolymer is 4,000 to 17,000.

A tenth aspect of the present invention provides the ink composition for inkjet textile printing according to any one of the first to ninth aspects, in which the ink composition further contains a water-soluble organic solvent.

An eleventh aspect of the present invention provides the ink composition for inkjet textile printing according to the tenth aspect, in which the water-soluble organic solvent includes at least one selected from glycerin and propylene glycol.

A twelfth aspect of the present invention provides a fiber dyed by the ink composition for inkjet textile printing according to any one of the first to eleventh aspects.

A thirteenth aspect of the present invention provides a method for textile printing hydrophobic fibers, in which the method includes: an attaching step of using the ink composition for inkjet textile printing according to any one of the first to eleventh aspects as an ink, and attaching a droplet of the ink to the hydrophobic fibers by way of an inkjet printer; a fixing step of fixing the dye in the ink attached to the hydrophobic fibers in the attaching step to the hydrophobic fibers by way of heat; and a washing step of washing off an unfixed dye remaining in the hydrophobic fibers.

A fourteenth aspect of the present invention provides the method for textile printing hydrophobic fibers according to the thirteenth aspect, in which the method further includes a pretreating step of applying an aqueous solution containing a sizing material, an alkaline substance, a reduction inhibitor, and a hydrotropic agent to the hydrophobic fibers before the ink is attached.

A fifteenth aspect of the present invention provides a method for textile printing hydrophobic fibers, in which the method includes: a printing step of using the ink composition for inkjet textile printing according to any one of the first to eleventh aspects as an ink, and attaching a droplet of the ink to an intermediate recording medium by an inkjet printer, to obtain a recorded image; and a transferring step of transferring the recorded image to hydrophobic fibers by bringing the hydrophobic fibers into contact with the surface of the intermediate recording medium to which the ink is attached, followed by heat treating.

Effects of the Invention

According to the present invention, it is possible to provide an ink composition for inkjet textile printing which is excellent in a re-discharge property after being left open, a drying property on a recording medium, and a color developing property, and a method for textile printing hydrophobic fibers using the same.

PREFERRED MODE FOR CARRYING OUT THE INVENTION

<Ink Composition>

The ink composition for inkjet textile printing according to the present embodiment (hereinafter simply referred to as "ink composition") contains a urethane resin, a dispersant, and a disperse dye, and the content of the urethane resin is greater than 0.035% by mass and less than 6% by mass. Hereinafter, each component contained in the ink composition according to the present embodiment is described.

(Urethane Resin)

As the urethane resin, known urethane resins such as a polycarbonate-based urethane resin or a polyether-based urethane resin may be used without any particular limitation. The urethane resin may be used alone or in combination of two or more.

Urethane resins are often commercially available in a form of emulsion (latex), and many of them are emulsions having a solid content of 30 to 60% by mass. Examples of commercial products of urethane resins include Permarin UA-150, 200, 310, 368T, 3945, UCOAT UX-320 (manufactured by Sanyo Chemical); Hydran WLS-201, 210, HW-312B (manufactured by DIC Corporation); Superflex 150, 170, 470 (manufactured by DKS Co., Ltd.); and UPUD-UW-1527F (manufactured by Ube Industries, Ltd.), and the like. Among these, examples of the polycarbonate-based urethane resin include Permarin UA-310, UA-368T, 3945; and UCOAT UX-320; and the like. Examples of the polyether-based urethane resin include Permarin UA-150, 200; UCOAT UX-340; and UPUD-UW-1527F; and the like. Solid contents of these emulsions may be adjusted by dilution or the like.

The content of urethane resin is greater than 0.035% by mass and less than 6% by mass. If the content of urethane resin greater than 0.035% by mass and less than 6% by mass, the re-discharge property after being left open, the drying property on the recording medium, and the color developing property will be favorable. The content of urethane resin is more preferably greater than 0.2% by mass and less than 6% by mass, even more preferably 2% by mass or more and less than 6% by mass, particularly preferably 3% by mass or more and less than 6% by mass, and most preferably 3% by mass or more and 5% by mass or less.

(Dispersant)

As the dispersant, known dispersants such as a styrene-(meth)acrylic copolymer or a formalin condensate of an aromatic sulfonic acid may be used. The dispersant may be used alone or in combination of two or more. It should be noted that, in the present disclosure, "(meth)acrylic" is used with a meaning including "acrylic" and "methacrylic".

Examples of the styrene-(meth)acrylic copolymer include a copolymer of (α-methyl)styrene-based monomer and a (meth)acrylic monomer. In the present disclosure, "(α-methyl)styrene" is used with a meaning including "α-methylstyrene" and "styrene".

Examples of the styrene-(meth)acrylic copolymer include an (α-methyl)styrene-acrylic acid copolymer, an (α-methyl)styrene-acrylic acid-acrylic acid ester copolymer, an (α-methyl)styrene-methacrylic acid copolymer, an (α-methyl)styrene-methacrylic acid-acrylic acid ester copolymer, an (α-methyl)styrene-acrylic acid ester-maleic anhydride copolymer, an acrylic acid ester-styrene sulfonic acid copolymer, an (α-methyl) styrene-methacrylic sulfonic acid copolymer, and the like. These styrene-(meth)acrylic copolymers may be used alone or in combination of two or more.

The mass average molecular weight of the styrene-(meth)acrylic copolymer is, for example, preferably 1,000 to 20,000, more preferably 2,000 to 19,000, and even more preferably 4,000 to 17,000. The mass average molecular weight of the styrene-(meth)acrylic copolymer is measured by the GPC (Gel Permeation Chromatography) method.

In addition, the glass transition temperature of the styrene-(meth)acrylic copolymer is, for example, preferably from 45 to 135° C., more preferably from 55 to 120° C., and even more preferably from 60 to 110° C.

Furthermore, the acid value of the styrene-(meth)acrylic copolymer is, for example, preferably 50 to 250 mg KOH/g, more preferably 100 to 250 mg KOH/g, and even more preferably 150 to 250 mg KOH/g. Setting the acid value to 50 mg KOH/g or more renders the solubility of the resin in water good, and dispersion stability of the disperse dye tends to improve. In addition, setting the acid value to 250 mg KOH/g or less suppresses affinity with an aqueous medium, and this tends to inhibit blurring from occurring in images after printing. It should be noted that the acid value of the resin represents the number of milligrams of KOH required to neutralize 1 g of the resin and is measured in accordance with JIS-K3054.

Examples of commercial products of the styrene-(meth)acrylic copolymer include Joncryl® 67, 678, 682, 683, 690, 52J, 57J, 60J, 63J, 70J, JDX-6180, HPD-196, HPD96J, PDX-6137A, 6610, JDX-6500, JDX-6639, PDX-6102B, PDX-6124 (manufactured by BASF Corporation), etc. Among these, Joncryl® 67 (mass average molecular weight: 12,500, acid value: 213 mg KOH/g), Joncryl® 678 (mass average molecular weight: 8,500, acid value: 215 mg KOH/g), Joncryl® 682 (mass average molecular weight: 1,700, acid value: 230 mg KOH/g), Joncryl® 683 (mass average molecular weight: 4,900, acid value: 215 mg KOH/g) and Joncryl® 690 (mass average molecular weight: 16,500, acid value: 240 mg KOH/g) are preferable, and Joncryl® 678 is more preferable. It should be noted that, in the present disclosure, the superscript RTM means a registered trademark.

The dispersion of the disperse dyes described below may be carried out by the following method, for example. Namely, a styrene-(meth)acrylic copolymer is added to a water-soluble organic solvent, and the temperature is increased to 90 to 120° C. to prepare a styrene-(meth)acrylic copolymer solution. To the prepared styrene-(meth)acrylic copolymer solution, an alkaline compound and water are added, and the temperature is decreased to prepare an emulsion liquid. Then, a disperse dye is mixed with the obtained emulsion liquid, and subjected to dispersing treatment.

Examples of the formalin condensates of aromatic sulfonic acids include formalin condensates of a creosote oil sulfonic acid; cresol sulfonic acid; phenol sulfonic acid; β-naphthalene sulfonic acid; β-naphthol sulfonic acid; β-naphthalene sulfonic acid; β-naphthol sulfonic acid; cresol sulfonic acid; 2-naphthol-6-sulfonic acid; and lignin sulfonic acid; and the like, as well as salts thereof (sodium salts, potassium salts, lithium salts, etc.). Among these, formalin condensates of creosote oil sulfonic acid; β-naphthalene sulfonic acid; and lignin sulfonic acid and salts thereof (e.g. sodium salts, potassium salts, lithium salts, etc.) are preferred. The formalin condensates of these aromatic sulfonic acids may be used alone or in combination of two or more.

Formalin condensates of aromatic sulfonic acids are also commercially available. Examples of the formalin condensates of β-naphthalene sulfonic acid include Demol N (manufactured by Kao Corporation). Examples of the formalin condensates of creosote oil sulfonic acid include Labelin W Series and Demol C (manufactured by Kao Corporation). Examples of the formalin condensates of special aromatic sulfonic acids include Demol SN-B (manufactured by Kao Corporation). Examples of the formalin condensates of methylnaphthalene sulfonic acid include Labelin AN Series (manufactured by DKS Co., Ltd.). Among these, Demol N, Labelin W Series, and Labelin AN Series are preferable, Demol N and Labelin W are more preferable, and Labelin W is even more preferable.

As the dispersant, the ink composition according to the present embodiment preferably contains at least one selected from styrene-(meth)acrylic copolymers and formalin condensates of aromatic sulfonic acids, and more preferably contains at least one selected from styrene-(meth)acrylic copolymers and formalin condensates of creosote oil sulfonates.

The content of dispersant is not particularly limited, but is preferably 1 to 15% by mass, more preferably 2 to 10% by mass, and more preferably 3 to 8% by mass, for example.

(Disperse Dye)

Examples of disperse dyes include disperse dyes and oil-soluble dyes, etc. More specifically, the examples include C.I. Disperse Yellow 3, 4, 5, 6, 7, 8, 9, 13, 23, 24, 30, 33, 34, 39, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 142, 149, 160, 162, 163, 164, 165, 179, 180, 182, 183, 186, 192, 198, 199, 200, 202, 204, 210, 211, 215, 216, 218, 224, 237; C.I. Disperse Orange 1, 1:1, 3, 5, 7, 11, 13, 17, 20, 21, 23, 25, 29, 30, 31, 32, 33, 37, 38, 42, 43, 44, 45, 47, 48, 49, 50, 53, 54, 55, 56, 57, 58, 59, 60, 61, 66, 71, 73, 76, 78, 80, 86, 89, 90, 91, 93, 96, 97, 118, 119, 127, 130, 139, 142; C.I. Disperse Red 1, 4, 5, 7, 11, 12, 13, 15, 17, 27, 43, 44, 50, 52, 53, 54, 55, 55:1, 56, 58, 59, 60, 65, 70, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 158, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 283, 288, 298, 302, 303, 310, 311, 312, 320, 323, 324, 328, 359; C.I. Disperse Violet 1, 4, 8, 11, 17, 23, 26, 27, 28, 29, 31, 33, 35, 36, 38, 40, 43, 46, 48, 50, 51, 52, 56, 57, 59, 61, 63, 69, 77, 97; C.I. Disperse Green 9; C.I. Disperse Brown 1, 2, 4, 9, 13, 19, 27; C.I. Disperse Blue 3, 5, 7, 9, 14, 16, 19, 20, 26, 26:1, 27, 35, 43, 44, 54, 55, 56, 58, 60, 62, 64, 64:1, 71, 72, 72:1, 73, 75, 77, 79, 79:1, 82, 83, 87, 91, 93, 94, 95, 96, 102, 106, 108, 112, 113, 115, 118, 120, 122, 125, 128, 130, 131, 139, 141, 142, 143, 145, 146, 148, 149, 153, 154, 158, 165, 165:1, 165:2, 167, 171, 173, 174, 176, 181, 183, 185, 186, 187, 189, 197, 198, 200, 201, 205, 207, 211, 214, 224, 225, 257, 259, 266, 267, 270, 281, 284, 285, 287, 288, 291, 293, 295, 297, 301, 315, 330, 333, 341, 353, 354, 358, 359, 360, 364, 365, 366, 368; C.I. Disperse Black 1, 3, 10, 24; C.I. Solvent Yellow 114; C.I. Solvent Orange 67; C.I. Solvent Red 146; C.I. Solvent Blue 36, 63, 83, 105, 111; and the like.

Among these disperse dyes, preferred dyes include C.I. Disperse Yellow 42, 49, 76, 83, 88, 93, 99, 119, 126, 160, 163, 165, 180, 183, 186, 198, 199, 200, 224, 237, C.I. Disperse Orange 25, 29, 30, 31, 38, 42, 44, 45, 53, 54, 55, 71, 73, 80, 86, 96, 118, 119; C.I. Disperse Red 73, 88, 91, 92, 111, 127, 131, 143, 145, 146, 152, 153, 154, 179, 191, 192, 206, 221, 258, 283, 302, 323, 328, 359; C.I. Disperse Violet 26, 35, 48, 56, 77, 97; C.I. Disperse Blue 27, 54, 60, 73, 77, 79, 79:1, 87, 143, 165, 165:1, 165:2, 181, 185, 197, 225, 257, 266, 267, 281, 341, 353, 354, 358, 360, 364, 365, 368; and the like. Examples of preferred dyes having thermal transfer applicability include C.I. Disperse Yellow 51, 54, 60, 82; C.I. Disperse Orange 5, 7, 20, 23, 25; C.I. Disperse Red 4, 11, 50, 53, 59, 60, 239, 240, 364; C.I. Disperse Violet 8, 11, 17, 26, 27, 28, 36; C.I. Disperse Blue 3, 5, 26, 35, 55, 56, 72, 81, 91, 108, 334, 359, 360, 366; C.I. Disperse Brown 27; C.I. Solvent Yellow 114; C.I. Solvent Orange 60, 67; C.I. Solvent Red 146; C.I. Solvent Blue 36, 63, 83, 105, 111; and the like.

The ink composition according to the present embodiment preferably contains at least one selected from the group consisting of C.I. Disperse Yellow, C.I. Disperse Orange, C.I. Disperse Blue, and C.I. Disperse Red as the disperse dye, and more preferably contains at least one selected from the group consisting of C.I. Disperse Yellow 54, C.I. Disperse Orange 25, C.I. Disperse Blue 360, and C.I. Disperse Red 60.

The disperse dyes may be used alone or in combination of two or more. For example, in the preparation of a black ink, an orange disperse dye and a red disperse dye are appropriately formulated to a blue disperse dye as a main dye to form a black color, and this can be used as a black disperse dye. In addition, a plurality of disperse dyes may be blended for the purpose of finely adjusting a color tone such as blue, orange, red, violet, and black to a more favorable color tone.

The disperse dye may be a dry coloring matter in a powder or aggregate form, and may be in the form of a wet cake or slurry. In addition, a small amount of a dispersant such as a surfactant may be added for the purpose of suppressing aggregation of coloring matter particles during or after the synthesis of the coloring matter. In addition, other water-insoluble coloring matters may be contained in a small amount within the range of color tone adjustment. There are grades, such as an industrial dyeing grade, a resin coloring grade, an ink grade, a toner grade, and an inkjet grade, in commercially available coloring matters and they are different in manufacturing methods, purities, particle sizes, etc. In order to suppress the cohesive property, a coloring matter of smaller particles is preferable, and a coloring matter having as few impurities as possible is preferable because of the influence of dispersion stability and ink discharge accuracy.

The content of disperse dye is not particularly limited, but is preferably from 1 to 15% by mass, more preferably from 2 to 10% by mass, and more preferably from 3 to 8% by mass, for example.

(Water)

The ink composition according to the present embodiment contains water. The preferred water used for the preparation of the ink is water that contains few impurities such as ion-exchanged water or distilled water.

The content of water is not particularly limited, but is preferably 40 to 65% by mass, more preferably 45 to 65% by mass, and even more preferably 45 to 60% by mass, for example.

(Other Components)

The ink composition according to the present embodiment may contain an ink preparation agent as necessary in addition to the above components. The ink preparation agent includes, for example, known additives such as a water-soluble organic solvent, an antiseptic and antifungal agent, a pH adjusting agent, a chelating agent, a rust preventive agent, an ultraviolet absorbing agent, a viscosity adjusting agent, a dye-dissolving agent, an anti-fading agent, a surface tension adjusting agent, and a defoaming agent.

The water-soluble organic solvent includes, for example, C1 to C4 alcohols such as methanol, ethanol, n-propanol, isopropanol, n-butanol, isobutanol, secondary butanol, tertiary butanol; amides such as N,N-dimethylformamide, N,N-dimethylacetamide; heterocyclic ketones such as 2-pyrrolidone, N-methyl-2-pyrrolidone, 1,3-dimethylimidazolidin-2-one, 1,3-dimethylhexahydropyrimid-2-one; ketones or keto alcohols such as acetone, methyl ethyl ketone, 2-methyl-2-hydroxypentan-4-one; cyclic ethers such as tetrahydrofuran, dioxane; mono-, oligo- or polyalkylene glycol or thioglycol having a C2 to C6 alkylene unit such as ethylene glycol, 1,2-propanediol, 1,3-propanediol, 2-methyl-1,3-propanediol, 1,2-butanediol, 1,4-butanediol, 1,2-pentanediol, 1,5-pentanediol, 1,2-hexanediol, 1,6-hexanediol, diethylene glycol, triethylene glycol, tetraethylene glycol, dipropylene glycol, polyethylene glycol, polypropylene glycol, thiodiglycol; polyols (preferably triols) such as glycerin, hexane-1,2,6-triol, trimethylolpropane; C1 to C4 monoalkyl ethers of polyhydric alcohols such as ethylene glycol monomethyl ether, ethylene glycol monoethyl ether, diethylene glycol monomethyl ether, diethylene glycol monoethyl ether, diethylene glycol monobutyl ether (butylcarbitol), triethylene glycol monomethyl ether, triethylene glycol monoethyl ether; γ-butyrolactone; dimethyl sulfoxide; and the like.

The water-soluble organic solvent also includes, for example, a substance which is solid at ambient temperature. Namely, a substance which is water soluble and an aqueous solution containing this substance which exhibits the same properties as a water-soluble organic solvent and can be used in expectation of the same effect, is referred to as a water-soluble organic solvent in the present disclosure, even though it is solid at room temperature. Such substances include, for example, solid polyhydric alcohols, saccharides, amino acids and the like.

The antiseptic and antifungal agent includes, for example, sodium dehydroacetate, sodium benzoate, sodium pyridinethione-1-oxide, zinc pyridinethione-1-oxide, 1,2-benzisothiazolin-3-one, amine salts of 1-benzisothiazolin-3-one, and Proxel® GXL, manufactured by Arti Chemical Industries, and the like.

As the pH adjusting agent, any substance may be used as long as it can control the pH of an ink composition within the range between 6.0 and 11.0 for the purpose of improving the storage stability of the ink composition. The pH adjusting agent includes, for example, carbonates of Group 1 elements in the periodic table, such as lithium carbonate, sodium carbonate, potassium carbonate; and aminosulfonates such as taurine; and the like.

The chelating agent includes, for example, disodium ethylenediaminetetraacetate, sodium nitrilotriacetate, sodium hydroxyethylenediaminetriacetate, sodium diethylenetriaminepentaacetate, sodium uracil diacetate, and the like.

The rust preventive agent includes, for example, acidic sulfites, sodium thiosulfate, ammonium thioglycolate, diisopropylammonium nitrite, pentaerythritol tetranitrate, dicyclohexylammonium nitrite, and the like.

The ultraviolet absorbing agent includes, for example, benzophenone-based compounds, benzotriazole-based compounds, cinnamic acid-based compounds, triazine-based compounds, and stilbene-based compounds, and the like. In addition, compounds which absorb ultraviolet rays and emit fluorescence, so-called fluorescent whitening agents, typified by benzoxazole-based compounds and the like, may also be used.

The viscosity adjusting agent includes water-soluble polymer compounds in addition to water-soluble organic solvents, for instance, polyvinyl alcohol, cellulose derivatives, polyamines, and polyimines, and the like.

The dye-dissolving agent includes, for example, urea, ε-caprolactam, ethylene carbonate, and the like.

The anti-fading agent is used for the purpose of improving the storage property of images. As the anti-fading agent, various organic and metal complex-based anti-fading agents may be used. The organic anti-fading agent includes hydroquinones, alkoxyphenols, dialkoxyphenols, phenols, anilines, amines, indanes, chromanes, alkoxyanilines, heterocycles, and the like. The metal complex-based anti-fading agent includes a nickel complex, a zinc complex, and the like.

The surface tension adjusting agent includes surfactants. Types of surfactants include anionic, cationic, amphoteric, nonionic, silicone-based, or fluorine-based surfactant, and the like.

The anionic surfactant includes, for example, alkylsulfocarboxylates; α-olefin sulfonates; polyoxyethylene alkyl ether acetates; N-acyl amino acids or salts thereof; N-acyl methyltaurates; alkyl sulfate polyoxyalkyl ether sulfates; alkyl sulfate polyoxyethylene alkyl ether phosphates; rosin acid soap; castor oil sulfate ester salts; lauryl sulfate salts; alkyl phenol type phosphate esters; alkyl type phosphate esters; alkyl aryl sulfonates; sulfosuccinate-based anionic surfactants such as diethyl sulfosuccinates, diethylhexyl sulfosuccinates, dioctyl sulfosuccinates; and the like. Commercially available products include, for example, trade names Lipal 835I, 860K, 870P, NTD, and MSC, manufactured by Lion Corporation; trade name Adeca Col EC8600, manufactured by Adeka Corporation; trade names Pelex OT-P, CS, TA, and TR, manufactured by Kao Corporation; trade names Rikamild ES-100, ES-200 and Rika Surf P-10, M-30, M-75, M-300, G-30, and G-600, manufactured by New Japan Chemical Co., Ltd.; and trade names Kohakunol L-300, L-40, L-400, and NL-400, manufactured by Toho Chemical Industry Co., Ltd, and the like.

The cationic surfactant includes, for example, 2-vinylpyridine derivatives and poly-4-vinylpyridine derivatives, and the like.

The amphoteric surfactant includes, for example, lauryl dimethylaminoacetate betaine, 2-alkyl-N-carboxymethyl-N-hydroxyethylimidazolinium betaine, cocoamidopropyl dimethylamino acetate betaine, polyoctylpolyaminoethylglycine and imidazoline derivatives, and the like.

The nonionic surfactant includes, for example, ether-based nonionic surfactants such as polyoxyethylenenonyl phenyl ether, polyoxyethyleneoctyl phenyl ether, polyoxyethylenedodecyl phenyl ether, polyoxyethylene oleyl ether, polyoxyethylene lauryl ether, polyoxyethylene alkyl ether; ester-based nonionic surfactants such as polyoxyethylene oleate, polyoxyethylene distearate, sorbitan laurate, sorbitan monostearate, sorbitan monooleate, sorbitan sesquiolate, polyoxyethylene monooleate, polyoxyethylene stearate; acetylene glycol (alcohol)-based nonionic surfactants such as 2,4,7,9-tetramethyl-5-decyne-4,7-diol, 3,6-dimethyl-4-octyne-3,6-diol, 3,5-dimethyl-1-hexin-3-ol; trade names Surfynol 104, 105, 82, 465, Olfin STG, etc., manufactured by Nissin Chemical Industry Co., Ltd.; polyglycol ether-based nonionic surfactants (Tergitol 15-S-7, etc., manufactured by SIGMA-ALDRICH Inc.); and the like.

The silicone-based surfactant includes, for example, polyether-modified siloxane, polyether-modified polydimethylsiloxane and the like. Commercially available products include, for example, BYK-347 (polyether-modified siloxane); BYK-345, BYK-348 (polyether-modified polydimethylsiloxane); and the like, all of which are manufactured by BYK Chemie.

The fluorine-based surfactant includes, for example, perfluoroalkyl sulfonic acid compounds, perfluoroalkyl carboxylic acid-based compounds, perfluoroalkyl phosphate ester compounds, perfluoroalkyl ethylene oxide adducts, and polyoxyalkylene ether polymer compounds having perfluoroalkyl ether groups on their side chains, and the like. Commercially available products include, for example, Zonyl TBS, FSP, FSA, FSN-100, FSN, FSO-100, FSO, FS-300, Capstone FS-30, FS-31 (manufactured by DuPont Corporation), PF-151N, PF-154N (manufactured by Omnova), and the like.

The defoaming agent includes, for example, a highly oxidized oil-based defoaming agent, a glycerin fatty acid ester-based defoaming agent, a fluorine-based defoaming agent, a silicone-based defoaming agent, and the like.

(Method for Preparing Ink Composition, etc.)

The method for preparing the ink composition according to the present embodiment is not particularly limited, and includes, for example, a method in which an aqueous dispersion of the disperse dye is prepared, and then the ink preparation agent such as a water-soluble organic solvent is added. The order in which these are mixed is not particularly limited.

Methods of preparing the aqueous dispersion of the disperse dye include known methods such as stirring and mixing each component constituting the aqueous dispersion using a sand mill (bead mill), a roll mill, a ball mill, a paint shaker, an ultrasonic disperser, a microfluidizer, and the like. Since foaming may occur when preparing the aqueous dispersion of the disperse dye, a defoaming agent such as a silicone-based or acetylene alcohol-based defoaming agent may be added as necessary. However, since some defoaming agents inhibit disperse dyes from being dispersed, it is preferable to use a defoaming agent which does not affect the stability or the like of the aqueous dispersion. Preferable defoaming agents include, for example, the Olfin Series (SK-14, etc.), manufactured by Nissin Chemical Industry Co., Ltd.; the Surfynol Series (104, DF-110D, etc.), manufactured by Air Products Japan Co., Ltd.; and the like.

The content of the disperse dye in the aqueous dispersion is usually from 10 to 60% by mass, preferably from 20 to 50% by mass, and more preferably from 20 to 40% by mass. In addition, the content of the dispersant in an aqueous dispersion is usually 1 to 36% by mass, preferably 5 to 30% by mass, more preferably 5 to 20% by mass, and even more preferably 5 to 15% by mass.

The content of the aqueous dispersion in the ink composition according to the present embodiment is usually 2 to 35% by mass, preferably 3 to 30% by mass, and more preferably 5 to 30% by mass. In addition, the content of the aqueous organic solvent in the ink composition according to the present embodiment is usually 10 to 50% by mass, preferably 15 to 50% by mass, more preferably 20 to 50% by mass, and even more preferably 30 to 50% by mass. Furthermore, the total content of the ink preparation agent in the ink composition according to the present embodiment is usually 0 to 25% by mass, and preferably has 0.01 to 20% by mass.

The aqueous dispersion or the ink composition is preferably subjected to microfiltration or the like for the purpose of preventing clogging of the nozzles of the inkjet printer. The pore size of the filter used for microfiltration is usually 0.1 to 1 μm, and preferably 0.1 to 0.8 μm.

It is preferable for physical property values of the ink composition according to the present embodiment to be adjusted to appropriate values in consideration of discharge amount, response speed, ink droplet flight characteristics, and the like of the inkjet printer to be used. The viscosity of the ink composition according to the present embodiment at 25° C. is preferably about 3 to 20 mPa·s when measured by an E-type viscometer from the viewpoint of discharge response characteristics at high speed. In addition, the surface tension of the ink composition according to the present embodiment at 25° C. is preferably about 20 to 45 mN/m as measured by the plate method.

The ink composition according to the present embodiment is excellent in the re-discharge property after being left open, the drying property on the recording medium, and the color developing property, and can maintain the printability required for various ink compositions for textile printing, in particular, ink compositions for inkjet textile printing. Above all, it is extremely useful as an ink composition for inkjet textile printing for sublimation transfer.

In addition, the ink composition according to the present embodiment is excellent in storage stability without solid precipitation, change in physical properties, change in color, and the like after storage for a long period of time. In addition, an initial filling property to an inkjet printer head is favorable, and the discharge property of ink and stability in continuous printing are also favorable. Moreover, a clear image can be obtained without blurring of the image on a recording medium after printing; there is no odor on the recording medium after printing; there is little influence on odor on a printed matter and a printing work environment; and transfer performance (there is little residual of the printed matter on paper after transfer) and permeability inhibition performance (there is no penetration to the back surface) when printed on cloth or paper are also excellent. In addition to these, the image recorded by the ink composition according to the present embodiment has excellent ozone gas resistance, high print density, a low color rendering property, low saturation, and high-quality hue. In addition, the image recorded by the ink composition according to the present embodiment is also excellent in various fastnesses, such as light resistance, moisture resistance, water resistance, abrasion resistance, and washing fastness. Furthermore, it is possible to perform full-color inkjet textile printing of excellent various fastness properties and good preservability, using ink compositions each containing yellow dye, orange dye, magenta dye, cyan dye, and black dye, etc. in combination. In addition, it is excellent in good color developing property in low-coated paper, good ink drying property in the printed paper, curl prevention property and mottling prevention property of the printed paper.

<Method for Textile Printing Hydrophobic Fibers>

The method for textile printing hydrophobic fibers according to the present embodiment is a method in which the ink composition according to the present embodiment is used as an ink and hydrophobic fibers are printed using the ink. The hydrophobic fibers include, for example, polyester fibers, nylon fibers, triacetate fibers, diacetate fibers, polyamide fibers, and mixed spun fibers using two or more species of these fibers, and the like. In addition, fibers obtained by mix spinning these hydrophobic fibers with regenerated fibers such as rayon, or natural fibers such as cotton, silk, wool are also included in the hydrophobic fibers in the present specification. Some of these fibers are known to have an ink-receiving layer (blurring prevention layer), and such fibers are also included in the hydrophobic fibers. Methods for forming an ink-receiving layer are known in the art, and fibers having an ink-receiving layer are also commercially available. The material, structure, and the like of the ink-receiving layer are not particularly limited, and may be used as appropriate according to the purpose and the like.

The textile printing methods of hydrophobic fibers are roughly classified into a direct textile printing method (direct printing method) and sublimation transfer textile printing method (sublimation transfer printing method).

The direct textile printing method includes: an attaching step of using the ink composition according to the present embodiment as an ink, and attaching a droplet of the ink to the hydrophobic fibers by way of an inkjet printer; a fixing step of fixing the dye in the ink attached to the hydrophobic fibers in the attaching step to the hydrophobic fibers by way of heat; and a washing step of washing off an unfixed dye remaining in the hydrophobic fibers.

The fixing step is generally performed by known steaming or baking. The steaming includes, for example, a method for dyeing (also referred to as wet heat fixing) a dye to the hydrophobic fibers by treating the hydrophobic fibers with a high-temperature steamer, usually at 170 to 180° C. for about 10 minutes, or with a high-pressure steamer, usually at 120 to 130° C. for about 20 minutes. The baking (thermosol) includes, for example, a method for dyeing (also referred to as dry heat fixing) a dye to the hydrophobic fibers by treating the fibers normally at 190 to 210° C. for about 60 to 120 seconds.

The washing step is a step of washing the obtained fibers with warm water and, if necessary, with water. The warm water or water to be used for washing may contain a surfactant. The washed fibers are also preferably dried, usually at 50 to 120° C. for 5 to 30 minutes.

On the other hand, the sublimation transfer textile printing method includes: a printing step of using the ink composition according to the present embodiment as an ink, and attaching a droplet of the ink to an intermediate recording medium by an inkjet printer, to obtain a recorded image; and a transferring step of transferring the recorded image to the hydrophobic fibers by bringing the hydrophobic fibers into contact with the surface of the intermediate recording medium to which the ink is attached, followed by heat treating.

As the intermediate recording medium, an intermediate recording medium in which the dye in the attached ink does not agglomerate on the surface thereof and sublimation of the dye is not hindered when the recorded image is transferred to the hydrophobic fibers is preferred. Examples of such an intermediate recording medium include paper on the surface of which an ink-receiving layer is formed with inorganic fine particles such as silica, and special paper for inkjet, or the like may be used.

The heat treatment in the transfer step usually includes dry heat treatment at about 190 to 200° C.

The method for textile printing hydrophobic fibers according to the present embodiment may further include a step of pretreating a fiber for the purpose of preventing blurring or the like. This pretreating step includes a step of applying an aqueous solution (a pretreating liquid) containing a sizing material, an alkaline substance, a reduction inhibitor, and a hydrotropic agent to the hydrophobic fiber before the ink is attached.

The sizing agent includes natural gums such as guar and locust bean; starches; marine algae such as soda alginate and Gloiopeltis; plant skin such as pectic acid; fibrous derivatives such as methyl fibrin, ethyl fibrin, hydroxyethyl cellulose and carboxymethyl cellulose; processed starch such as carboxymethyl starch; synthetic glue such as polyvinyl alcohol and polyacrylate esters; and the like. Soda alginate is preferable.

The alkaline substance includes, for example, alkali metal salts of inorganic acids or organic acids; salts of alkaline earth metals; compounds which liberate alkali when heated; and the like. Inorganic or organic alkali metal hydroxides and alkali metal salts are preferable, and sodium compounds, potassium compounds, and the like are exemplified. Specific examples include alkali metal hydroxides such as sodium hydroxide and calcium hydroxide; alkali metal salts of inorganic compounds such as sodium carbonate, sodium bicarbonate, potassium carbonate, sodium dihydrogen phosphate, disodium hydrogen phosphate and sodium phosphate; alkali metal salts of organic compounds such as sodium formate and sodium trichloroacetate; and the like. Sodium bicarbonate is preferable.

As the reduction inhibitor, sodium meta-nitrobenzenesulfonate is preferable. As the hydrotropic agent, ureas such as urea and dimethylurea may be exemplified, and urea is preferable.

With regard to all of the sizing agent, the alkaline substance, the reduction inhibitor, and the hydrotropic agent, one type may be used alone, or two or more types may be used in combination.

The mixing ratio of each component in the pretreating liquid is, for example, 0.5 to 5% by mass of a sizing agent, 0.5 to 5% by mass of sodium bicarbonate, 0 to 5% by mass of sodium meta-nitrobenzenesulfonate, 1 to 20% by mass of urea, and the balance of water.

Methods of attaching the pretreating liquid to hydrophobic fibers include, for example, a padding method. The aperture ratio of padding is preferably about 40 to 90%, and more preferably about 60 to 80%.

EXAMPLES

In the following, the present invention is explained in more detail by way of the Examples; however, the present invention is not limited to these Examples. In the Examples, unless otherwise specified, "parts" indicates parts by mass and "%" indicates % by mass.

Preparation Example 1: Preparation of Emulsion Liquid

To a mixture of 48% lithium hydroxide (3.2 parts), ion-exchanged water (56.8 parts) and propylene glycol (20 parts), 20 parts of Joncryl® 678 (manufactured by BASF Corporation) were added, and the mixture was heated to 90 to 120° C. and stirred for 5 hours to obtain an emulsion liquid of Joncryl® 678.

Preparation Example 2: Preparation of Aqueous Dispersion 1

A mixture of Kayaset Red B (30 parts) (C.I. Disperse Red 60, manufactured by Nippon Kayaku Co., Ltd.) as the sublimable dye, the emulsion liquid (60 parts) of Joncryl® 678 obtained in Preparation Example 1, Proxel® GXL (0.2 parts), Surfynol 104PG50 (0.4 parts), and ion-exchanged water (24 parts) was subjected to dispersing treatment while cooling for about 15 hours in a sand mill including 0.2 mm diameter glass beads. To the liquid after the dispersing treatment, ion-exchanged water (60 parts) and the emulsion liquid (30 parts) of Joncryl® 678 obtained in Preparation Example 1 were added to adjust the dye content to 15%, followed by filtration using a glass fiber filter paper GC-50 (Toyo Filter Paper Co., Ltd., pore size of the filter: 0.5 μm), to obtain aqueous dispersion 1.

Preparation Example 3: Preparation of Aqueous Dispersion 2

A mixture of Kayaset Red B (30 parts) (C.I. Disperse Red 60, manufactured by Nippon Kayaku Co., Ltd.) as the sublimable dye, Labelin® W-40 (45 parts) (40% aqueous solution of formalin condensate of creosote oil sulfonate salt, manufactured by DKS Co., Ltd.) as the anionic dispersant, NIKKOL® BPS-30 (2 parts) (30 moles of EO (ethylene oxide) adduct of phytosterol, manufactured by Nikko Chemicals Co., Ltd.) as the nonionic dispersant, and ion exchanged water (23 parts) was subjected to dispersing treatment while cooling for about 15 hours in a sand mill including 0.2 mm diameter glass beads. To the liquid after the dispersing treatment, ion-exchanged water (100 parts) was added to adjust the dye content to 15%, followed by filtration using a glass fiber filter paper GC-50 (Toyo Filter Paper Co., Ltd., pore size of the filter: 0.5 μm), to obtain aqueous dispersion 2.

Preparation Example 4: Preparation of Polyethylene Glycol Solution

Polyethylene glycol 2000 (30 parts) (manufactured by Tokyo Chemical Industries, Co., Ltd.) heated to 50° C. was added to ion-exchanged water (70 parts) heated to 60° C., and the mixture was heated to 50 to 70° C. and stirred for 2 hours to obtain a 30% solution of polyethylene glycol 2000.

Example 1

An aqueous ink was prepared by mixing the aqueous dispersion 1 (30 parts) obtained in Preparation Example 2, glycerin (20 parts), UCOAT UX320 (8.75 parts) (urethane resin with a solid content of 40%, manufactured by Sanyo Chemical Industries, Ltd.), propylene glycol (8 parts), BYK- 348 (0.2 parts) (polyether-modified polydimethylsiloxane, manufactured by BYK Chemie Japan), and ion-exchanged water (33.05 parts).

Example 2

An aqueous ink was prepared in the same manner as in Example 1, except that Permarin UA368T (6.94 parts) (urethane resin with a solid content of 49.7%, manufactured by Sanyo Chemical Industries, Ltd.) was used instead of UCOAT UX320 (8.75 parts) and the amount of ion-exchanged water was changed to 34.86 parts.

Example 3

An aqueous ink was prepared in the same manner as in Example 1, except that Permarin UA150 T (11.5 parts) (urethane resin with a solid content of 30%, manufactured by Sanyo Chemical Industries, Ltd.) was used instead of UCOAT UX320 (8.75 parts) and the amount of ion-exchanged water was changed to 30.30 parts.

Example 4

An aqueous ink was prepared in the same manner as in Example 1, except that UPUD-UW-1527F (11.7 parts) (urethane resin with a solid content of 30%, manufactured by Ube Industries, Ltd.) was used instead of UCOAT UX320 (8.75 parts) and the amount of ion-exchanged water was changed to 30.10 parts.

Example 5

An aqueous ink was prepared by mixing the aqueous dispersion 2 (30 parts) obtained in Preparation Example 3, glycerin (20 parts), UCOAT UX320 (8.75 parts) (urethane resin with a solid content of 40%, manufactured by Sanyo Chemical Industries, Ltd.), propylene glycol (8 parts), BYK-348 (0.2 parts) (polyether-modified polydimethylsiloxane, manufactured by BYK Chemie Japan), and ion-exchanged water (33.05 parts).

Example 6

An aqueous ink was prepared by mixing the aqueous dispersion 2 (30 parts) obtained in Preparation Example 3, glycerin (20 parts), UCOAT UX320 (12.5 parts) (urethane resin with a solid content of 40%, manufactured by Sanyo Chemical Industries, Ltd.), propylene glycol (8 parts), BYK-348 (0.2 parts) (polyether-modified polydimethylsiloxane, manufactured by BYK Chemie Japan), and ion-exchanged water (29.3 parts).

Comparative Example 1

An aqueous ink was prepared in the same manner as in Example 1, except that UCOAT UX320 was not added and the amount of ion-exchanged water was changed to 41.80 parts.

Comparative Example 2

An aqueous ink was prepared in the same manner as in Example 1, except that AQUACER 515 (10 parts) (polyethylene resin emulsion, manufactured by BYK-Chemie Japan, Inc.) was used instead of UCOAT UX320 (8.75 parts) and the amount of ion-exchanged water was changed to 31.80 parts.

Comparative Example 3

An aqueous ink was prepared in the same manner as in Example 1, except that Mowinyl 6960 (7.78 parts) (acrylic resin emulsion, manufactured by Nippon Synthetic Chemical Industry Co., Ltd) was used instead of UCOAT UX320 (8.75 parts) and the amount of ion-exchanged water was changed to 34.02 parts.

Comparative Example 4

An aqueous ink was prepared in the same manner as in Example 1, except that AE-609 (14.0 parts) (acrylic resin emulsion, manufactured by E-TEC Co., Ltd.) was used instead of UCOAT UX320 (8.75 parts) and the amount of ion-exchanged water was changed to 27.80 parts.

Comparative Example 5

An aqueous ink was prepared in the same manner as in Example 1, except that the polyethylene glycol solution (11.7 parts) obtained in Preparation Example 4 was used instead of UCOAT UX320 (8.75 parts) and the amount of ion-exchanged water was changed to 30.10 parts.

Comparative Example 6

An aqueous ink was prepared by mixing the aqueous dispersion 2 (30 parts) obtained in Preparation Example 3, glycerin (20 parts), UCOAT UX320 (27.5 parts) (urethane resin with a solid content of 40%, manufactured by Sanyo Chemical Industries, Ltd.), propylene glycol (8 parts), BYK-348 (0.2 parts) (polyether-modified polydimethylsiloxane, manufactured by BYK Chemie Japan), and ion-exchanged water (14.3 parts).

The following evaluation tests were performed using the inks prepared as described above.

(Evaluation of Re-Discharge Properties After Being Left Open)

Each of the prepared inks was filled into an inkjet printer (PX-504A, manufactured by Seiko Epson Corporation), 100% Duty image was printed, and then discharge was stopped. After being left for 30 minutes, inkjet printing was started again, and the discharge property immediately after the start was visually confirmed to evaluate the property in accordance with the following three evaluation criteria A to C. Test results are shown in Table 1 below.

—Evaluation Criteria—
A: No rubbing is observed on the printed portion.
B: Slight rubbing is observed on the printed portion.
C: Clearly rubbing of the printed area is observed.

(Evaluation of Color Developing Property)

Each of the prepared inks was filled into an inkjet printer (PX-504A, manufactured by Seiko Epson Corporation) and solid printing was performed as a 100% Duty image on the following three types of recording media (paper A to paper C) which are different in basis weight (weight). In general, it is considered that, with a lower basis weight, the penetration by solvent or the like will proceed more, and this results in lower color developing property. The ink-applied surface of the obtained recording medium was cut into a predetermined size (35 cm×40 cm), superimposed on a piece of polyester cloth (pongee) of the same size, and then heat-treated using a transfer press machine (TP-600A2, manufactured by Taiyo Seiki Co., Ltd.) under conditions of 200° C.×60 seconds, so that sublimation transfer textile printing was performed from the recording medium to the piece of polyester cloth to prepare a piece of dyed cloth.
Paper A: sublimation transfer paper (Hansol, basis weight: 50 g/m$^2$)
Paper B: Japanese paper KB-W115w for PPC (manufactured by Kokuyo Co., Ltd., basis weight: 60 g/m$^2$)
Paper C: sublimation transfer paper TRS75-1320 (manufactured by Mimaki Engineering Co., Ltd., basis weight: 75 g/m$^2$)

The dyeing density (Density Magenta; DM) of each of the obtained pieces of dyed cloth was measured using a colorimeter (Spectro Eye, manufactured by GRETAG-MACBETH Corporation). Results are shown in Table 1 below.
(Evaluation of Paper Dryness)

Each of the prepared inks was filled into an inkjet printer (PX-504A, manufactured by Seiko Epson Corporation) and solid printing was performed as a 100% Duty image on sublimation transfer paper TRS75-1320 (manufactured by Mimaki Engineering CO., Ltd.). After printing, the image on the paper was rubbed to evaluate the time until the image was no longer lost. Results are shown in Table 1 below.

TABLE 1

| | Re-discharge property after being left open | Paper surface drying property | Color developing property (Density Magenta) | | |
|---|---|---|---|---|---|
| | | | Paper A | Paper B | Paper C |
| Example 1 | A | 40 seconds | 1.39 | 1.38 | 1.43 |
| Example 2 | A | 30 seconds | 1.37 | 1.36 | 1.42 |
| Example 3 | A | 30 seconds | 1.38 | 1.37 | 1.41 |
| Example 4 | A | 30 seconds | 1.36 | 1.37 | 1.43 |
| Example 5 | A | 30 seconds | 1.35 | 1.36 | 1.41 |
| Example 6 | A | 30 seconds | 1.38 | 1.37 | 1.45 |
| Comparative Example 1 | A | 90 seconds | 1.18 | 1.20 | 1.41 |
| Comparative Example 2 | B | 100 seconds | 1.23 | 1.21 | 1.41 |
| Comparative Example 3 | A | 90 seconds | 1.27 | 1.18 | 1.41 |
| Comparative Example 4 | A | 90 seconds | 1.27 | 1.20 | 1.42 |
| Comparative Example 5 | C | 30 seconds | 1.35 | 1.37 | 1.43 |
| Comparative Example 6 | B | 30 seconds | 1.34 | 1.33 | 1.40 |

As is clear from the results of Table 1, the aqueous inks of Examples 1 to 6 were excellent in the re-discharge property after being left open, the paper surface drying property, and the color developing property. On the other hand, the aqueous inks of Comparative Examples 1 to 4 were inferior in the paper surface drying property and the color developing property, and the aqueous ink of Comparative Example 2 was inferior in the re-discharge property after being left open as well. The aqueous ink of Comparative Example 5 was noticeably inferior in the re-discharge property after being left open. Furthermore, the aqueous ink of Comparative Example 6 was inferior in the discharge property after being left open and the color developing property.

From these results, it was found that the aqueous inks of Examples 1 to 6 have the above-mentioned performances (re-discharge property after being left open, paper surface dryness property, and color developing property), and are extremely useful as inks for various types of recording, in particular, as inks for inkjet textile printing.

The invention claimed is:

1. An ink composition for inkjet textile printing, consisting essentially of a urethane resin, a dispersant a disperse dye, water, and at least one ink preparation agent selected from the group consisting of a water-soluble organic solvent, an antiseptic and antifungal agent, a pH adjusting agent, a chelating agent, a rust preventive agent, an ultraviolet absorbing agent, a viscosity adjusting agent, a dye-dissolving agent, an anti-fading agent, a surface tension adjusting agent, and a defoaming agent, wherein the content of the urethane resin is greater than 0.035% by mass and less than 6% by mass.

2. The ink composition for inkjet textile printing according to claim 1, wherein the content of the urethane resin is greater than 2% by mass and less than 6% by mass.

3. The ink composition for inkjet textile printing according to claim 1, wherein the urethane resin includes at least one selected from polycarbonate-based urethane resins and polyether-based urethane resins.

4. The ink composition for inkjet textile printing according to claim 1, wherein the disperse dye includes at least one selected from the group consisting of C.I. Disperse Yellow, C.I. Disperse Orange, C.I. Disperse Blue and C.I. Disperse Red.

5. The ink composition for inkjet textile printing according to claim 4, wherein the disperse dye includes at least one selected from the group consisting of C.I. Disperse Yellow 54, C.I. Disperse Orange 25, C.I. Disperse Blue 56, C.I. Disperse Blue 72, C.I. Disperse Blue 359, C.I. Disperse Blue 360 and C.I. Disperse Red 60.

6. The ink composition for inkjet textile printing according to claim 1, wherein the dispersant includes at least one selected from styrene-(meth)acrylic copolymers and formalin condensates of aromatic sulfonic acids.

7. The ink composition for inkjet textile printing according to claim 6, wherein the mass average molecular weight of the styrene-(meth)acrylic copolymer is 1,000 to 20,000.

8. The ink composition for inkjet textile printing according to claim 7, wherein the mass average molecular weight of the styrene-(meth)acrylic copolymer is 2,000 to 19,000.

9. The ink composition for inkjet textile printing according to claim 8, wherein the mass average molecular weight of the styrene-(meth)acrylic copolymer is 4,000 to 17,000.

10. The ink composition for inkjet textile printing according to claim 1, wherein the water-soluble organic solvent is the ink preparation agent.

11. The ink composition for inkjet textile printing according to claim 10, wherein the water-soluble organic solvent includes at least one selected from glycerin and propylene glycol.

12. A fiber dyed by the ink composition for inkjet textile printing according to claim 1.

13. A method for textile printing hydrophobic fibers, comprising:
    using the ink composition for inkjet textile printing according to claim 1 as an ink, and attaching a droplet of the ink to the hydrophobic fibers using an inkjet printer;
    fixing the dye in the ink attached to the hydrophobic fibers to the hydrophobic fibers by heating; and
    washing off any unfixed dye remaining in the hydrophobic fibers.

14. The method for textile printing hydrophobic fibers according to claim 13, further comprising applying an aqueous solution containing a sizing material, an alkaline substance, a reduction inhibitor, and a hydrotropic agent to the hydrophobic fibers before the ink is attached.

15. A method for textile printing hydrophobic fibers, comprising:

using the ink composition for inkjet textile printing according to any claim 1 as an ink, and attaching a droplet of the ink to an intermediate recording medium by an inkjet printer, to obtain a recorded image; and transferring the recorded image to the hydrophobic fibers by bringing the hydrophobic fibers into contact with the surface of the intermediate recording medium to which the ink is attached, followed by heat treating.

\* \* \* \* \*